L. G. LONG.
LUBRICATION OF VERTICAL SHAFT MACHINERY.
APPLICATION FILED MAY 13, 1914.

1,277,439.

Patented Sept. 3, 1918.

Witnesses
H. A. French.
Thurman T. Hall.

Inventor
L. Guy Long
Attorney

UNITED STATES PATENT OFFICE.

LEO GUY LONG, OF INDIANAPOLIS, INDIANA.

LUBRICATION OF VERTICAL-SHAFT MACHINERY.

1,277,439.

Specification of Letters Patent.

Patented Sept. 3, 1918.

Application filed May 13, 1914. Serial No. 838,237.

*To all whom it may concern:*

Be it known that I, LEO GUY LONG, a citizen of the United States, residing in the city of Indianapolis, in the county of Marion, in the State of Indiana, have invented certain new and useful Improvements in the Lubrication of Vertical-Shaft Machinery, of which the following is a full, clear, and exact description, such as will enable others skilled in the art to make and use the same.

Figure 1:
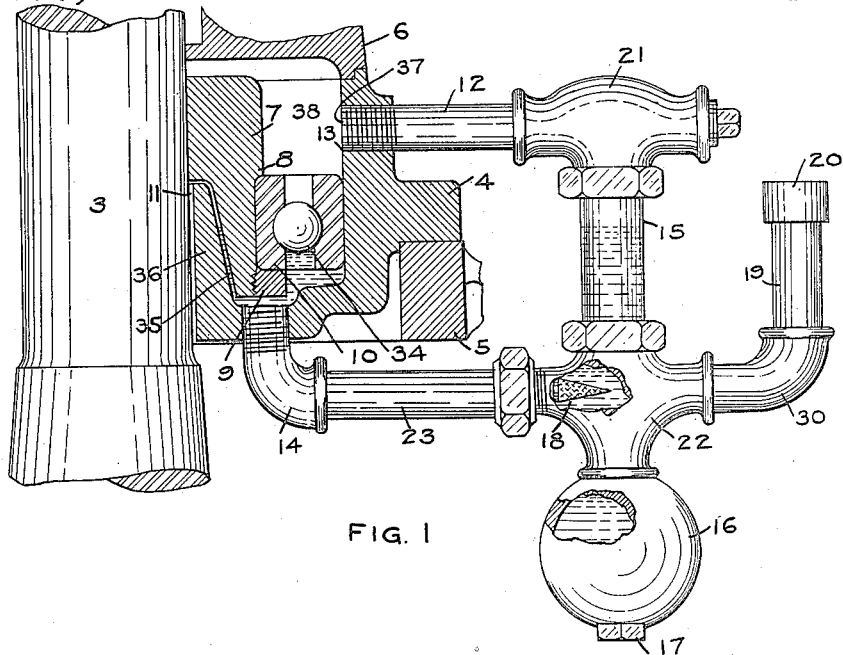
Figure 2:
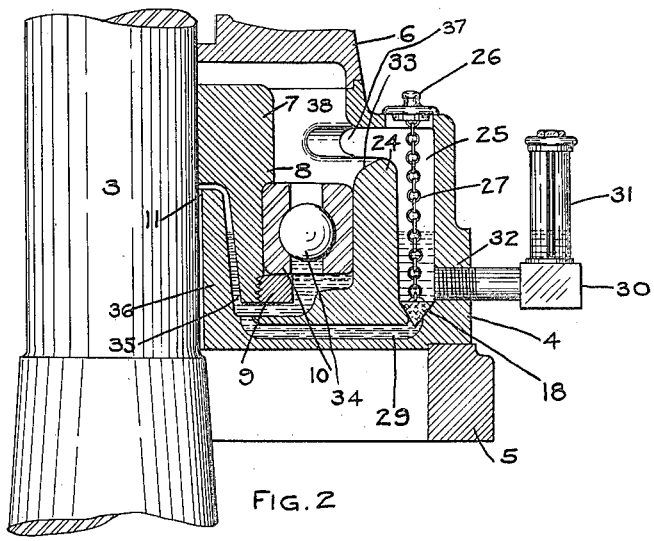

My invention consists in the construction and arrangement of parts hereinafter described and particularly pointed out in the claims. In describing the various arrangements employed and shown in the drawings hereto attached and described in the specification I do not limit my invention to the precise form or construction of apparatus shown or the several parts thereof inasmuch as various alterations may be made without changing the scope of my invention. While my invention may be used on any machine using a vertical shaft and requiring the flooded lubrication, it is particularly valuable in electric generators and motors of the vertical type which run at high speed and the object of my invention is to secure the maximum lubrication possible in such machinery. Figure 1 is a sectional view showing my invention in which the oil is made to circulate through the system of pipes and oil tubes by means of centrifugal action. Fig. 2 shows another form of my invention in which the circulation of the oil is effected within the bearing chamber. In the drawings 3 represents the central vertical shaft, 4 the bearing housing, 5 a support, 6 an inclosing cap, 7 a collar rigidly embracing the shaft and resting at its shoulder 8 upon ball bearing inner race 10. 34 is a ball bearing which may be of any form. The nut 9 is threaded into the lower portion of the collar 7 and serves to hold the bearing race 10 snugly against the shoulder 8. 11 is the annular space between the shaft and the encircling wall of the bearing chamber. 12 is a pipe inserted into the bearing chamber. 13 is an outer dam which in Fig. 1 is also the inner wall of the bearing chamber. 14 is an elbow inserted into the base of the bearing chamber. 15 is an inspection glass. 16 is a settling basin. 17 is a tap in the settling basin to remove foreign matter. 18 is a filter which may be of any suitable material or form. 19 is a filler pipe. 20 is a filler cap. 21 is a piece which connects the pipe 12 with the inspection glass 15, and 22 is a fitting. 23 is a pipe. 30 is an elbow connecting the filler tube with the fitting 22. 35 is the annular space. 36 is an inner dam. In Fig. 2, 24 is the outer dam. 25 is the oil channel. 26 is a filler cap, 27 a chain attached to filter 18. 29 is the lower channel which connects the oil channel 25 with the base of the bearing well 38. 31 is an inspection glass. 32 is a pipe and 33 is the face of the outer dam. 37 is an aperture in the wall of the dam, through which the oil passes into the oil channel 25. This aperture may be of any suitable shape or size and more than one may be used when desired.

The arrangement of Fig. 1, when the vertical shaft begins to rotate the oil within the bearing chamber is by centrifugal force moved outwardly and gradually rises along the face of the outer dam of the bearing chamber until it reaches the pipe 12 whereupon it flows through the pipe 12, through the upper fitting 21, the glass tube 15 thence into the fitting 22, thence passes through the filter 18, the pipe 23, and thence through the elbow 14 into the base of the bearing well. As soon as motion starts within the bearing and the oil starts to climb the sides of the inner wall of the bearing chamber the oil level is lowered in the glass tube and this creates a certain suction in the upper pipe and aids in drawing the oil out of the bearing through the upper pipe. At the same time the point of low pressure within the bearing is near the point of entrance of the inner pipe and a second suction is created at this point tending to draw oil in from the tubes. When the bearings rotate at high rates of speed the oil within the bearing chambers is agitated and churned until it is in a foamy condition and in such condition it is of slight lubricating value but by my invention I am able to secure an approximately constant lubrication by oil free from bubbles and froth. The pipe 12 is placed at such a point in the wall of the bearing chamber that it will carry off the oil when the shaft is in motion. The oil so expelled through this outlet pipe passes through fitting 21, glass tube 15, fitting 22, pipe 23 and elbow 14 into the base of the bearing well. The pipe 23 is made small enough so as to permit only a sufficient quantity of oil for the bearing to be drawn back into the bearing chamber. The oil thus slowly flows through pipe 23 and an excess of oil in the bearing chamber is avoided. Such an excess of oil tends to increase the agitation and foaming. Another advantage resulting from making the return pipe 23 small is to prevent a back surging of the oil when the motor stops. Under high speed the oil is thrown outwardly against the walls of the bearing chamber and the inertia of the moving oil holds it about the outer circumference of the container until the shaft has practically stopped, and then upon losing the effect of this inertia it surges back to the shaft through the annular space 35 and over the inner dam 36 thereby setting up a siphon action which often will completely empty the bearing.

While in Fig. 1 I have shown the oil conduit made up of the elements 12, 21, 15, 22, 23 and 14, it is obvious that a lesser number of pieces may be used without departing from the scope of my invention. Instead of using the glass tube 15 I may instead use a metallic tube. Likewise, I may substitute a glass tube in place of the metallic one shown at 19. The filter is shown as a cone but may be any desired shape and material. The settling basin receives the foreign matter which fails to pass through the filter and the tap 17 is used to remove same, although filter and settling basin may both be omitted.

The arrangement shown in Fig. 1, I prefer to use on shafts where the heating of the oil is very great and the arrangement of Fig. 2 on ordinary vertical shafting. However, either arrangement may be used successfully on swiftly moving shafts.

In Fig. 2 the oil is thrown outwardly under rotation and rises against the wall 24 of the outer dam. Instead of passing through the pipe 12 it passes through the aperture 37 into the oil channel 25. Then it flows through the small channel 29 into the base of the bearing well. To the filter cap 26 is attached a chain by which the filter 28 is removed. I do not show a settling basin below the filter but it may be easily provided. The inspection glass 31 shows the height of the oil in the bearing chamber. The oil flowing into the oil channel is cooled by mingling with a larger quantity of oil. This channel like the glass tube 15 is practically a cooling reservoir. In this way I provide the bearing with a greater quantity of oil than could be contained within the bearing well without making it unduly large. I make the return conduit enter the base of the bearing well as close to the shaft as is practically possible.

I claim as my invention:

1. The combination with a vertical shaft to be lubricated, and a bearing therefor, of a housing formed to provide a chamber of a size to contain the bearing and also to serve as a reservoir for a considerable body of lubricant, the lubricant being free to rise in such chamber under the action of centrifugal force when the shaft is rapidly revolved, an oil chamber outside the housing, a communicating channel uniting the said oil chamber with the bearing chamber within the housing at a level above that occupied by the body of oil within the bearing chamber when at rest, the said channel being free and open to permit the easy and rapid flow of the oil from the bearing chamber when elevated therein by centrifugal force to the level of the opening into said channel, and a freely open channel uniting the lower parts of the oil chamber and the bearing chamber within the housing.

2. The combination with a vertical shaft and a bearing therefor, of a housing in which the bearing for the shaft is arranged, there being a bearing chamber within the housing of a size to serve as a reservoir for a considerable body of lubricant and through the walls of which are openings, one being at a level above that of the body of lubricant when at rest and the other below such level, an oil settling and cooling chamber outside the housing through which the lubricant circulates when the shaft revolves, and freely open conduits uniting the said oil cooling and settling chamber and the bearing chamber within the housing connected respectively with the latter through the aforesaid apertures.

L. GUY LONG.

Witnesses:
O. S. MORE,
R. FLEMING.